Figure 1:
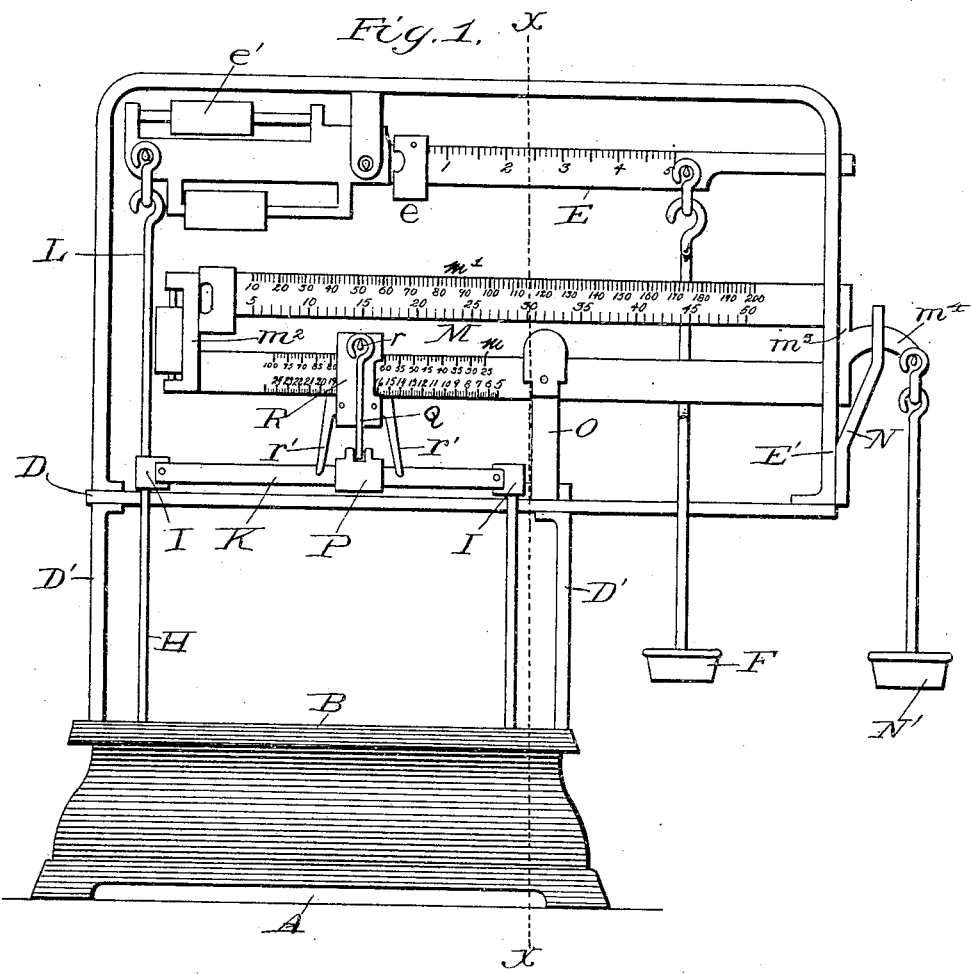

J. W. CULMER.
SCALE.
APPLICATION FILED JUNE 10, 1905.

964,089.

Patented July 12, 1910.

3 SHEETS—SHEET 1.

Witnesses
[signature] Bindine
James O'Neil.

Inventor
John W. Culmer
By [signature]
Attorney

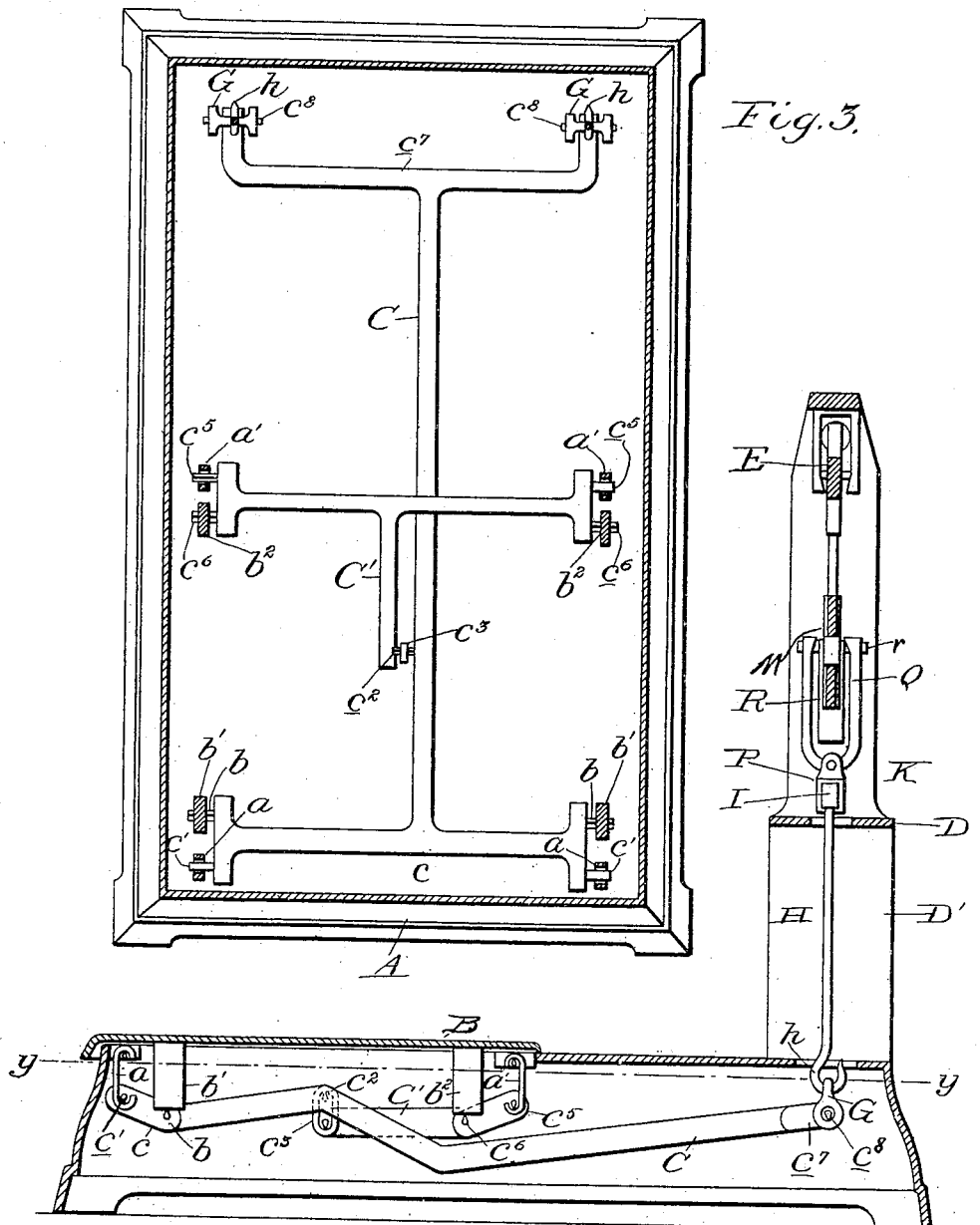

J. W. CULMER.
SCALE.
APPLICATION FILED JUNE 10, 1905.
964,089.
Patented July 12, 1910.
3 SHEETS—SHEET 3.
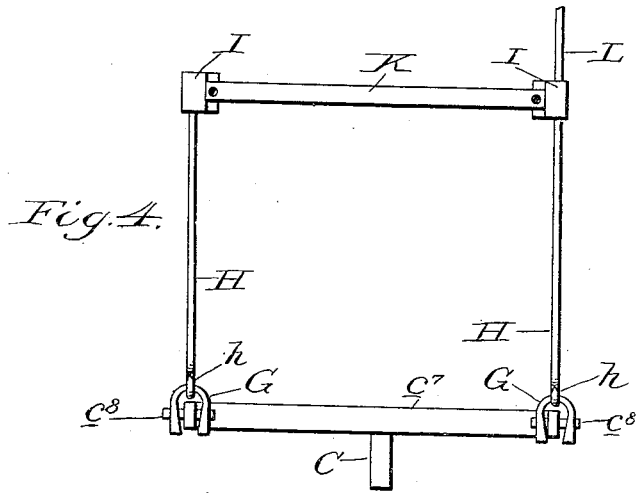
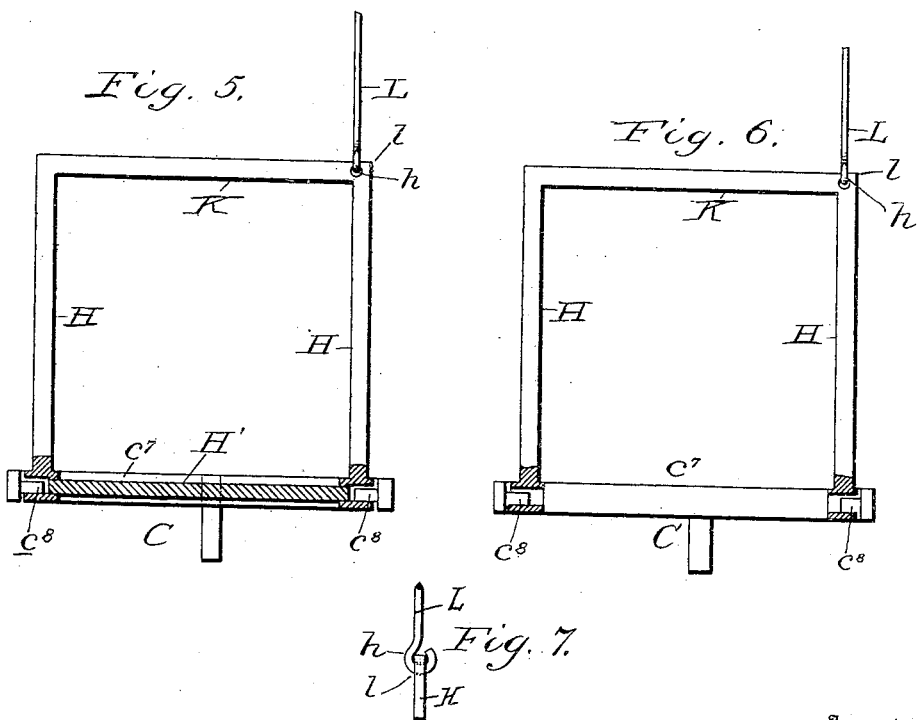
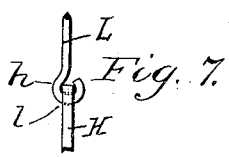
Witnesses
Inventor
John W. Culmer
By
Attorney

UNITED STATES PATENT OFFICE.

JOHN W. CULMER, OF CLEVELAND, OHIO, ASSIGNOR, BY MESNE ASSIGNMENTS, TO NATIONAL SCALE COMPANY, A CORPORATION OF PENNSYLVANIA.

SCALE.

964,089.     Specification of Letters Patent.     Patented July 12, 1910.

Original application filed November 20, 1895, Serial No. 569,493. Renewed April 30, 1904, Serial No. 205,825. Divided and this application filed June 10, 1905. Serial No. 264,687.

*To all whom it may concern:*

Be it known that I, JOHN W. CULMER, a citizen of the United States, residing at Cleveland, in the county of Cuyahoga and State of Ohio, have invented certain new and useful Improvements in Scales, of which the following is a specification, reference being had therein to the accompanying drawing.

My invention relates to improvements in combined weight and price scales, particularly of that class in which the motion of the weight supporting levers is transmitted to the computing, or price, beam through a connection adapted to move along a pivotally supported rod, having its pivots parallel to the pivots of the weight supporting levers, and lying below and parallel to the computing beam.

In the accompanying drawings:—Figure 1 is a front elevation of a scale embodying my improvements; Fig. 2 is a vertical sectional view on the line $x$, $x$, of Fig. 1; Fig. 3 is a plan view, partly in section on the line $y$, $y$, of Fig. 2; Fig. 4 is a rear elevation of the connection between the weight supporting levers and the pivoted supporting rod or bar for the poise on the computing or price, beam of the scale; Figs. 5 and 6 are similar views, showing slightly modified constructions; Fig. 7 is a detail.

Like letters of reference designate corresponding parts in the several figures of the drawing, referring to which:

A designates the base of the scale, B the weight sustaining platform, C, C' the main and supplemental weight supporting levers, D a cap, supported from the base by standards D', E the weighing beam supported within a frame mounted on the cap piece D, provided with a swinging poise F, sliding poise $e$ and gravity ball $e'$, and connected with the main lever C.

The above described parts constitute an ordinary weighing scale.

As shown in Fig. 3 the main lever C is preferably provided at its rear end with a cross piece $c$ having at its ends projecting pivot or fulcrum lugs $c'$, adapted to fit into loops $a$ on the base A; and also with bearing lugs $b$ for supporting the rear portion of the platform B, through depending arms $b'$. At an intermediate point of its length the main lever is provided with a laterally projecting lug $c^2$, which is connected, by means of a loop $c^3$, with a corresponding lug situated near the rear end of the supplemental lever C', the forward end of such lever having pivot or fulcrum lugs $c^5$ adapted to be supported in loops $a'$ on the base A. The forward portion of the platform B is supported by arms $b^2$ resting on lugs $c^6$ on said supplemental lever. The cross piece $c^7$ at the forward end of the main lever C has its ends bent to extend substantially at right angles to the body thereof, and each end has lugs $c^8$ extending parallel to the bearing lugs $b$ and extending into loops G.

With the loops G engage hooks $h$ at the lower ends of rods or links H, the upper ends of which are screwed into, or otherwise connected to, blocks I. These blocks I are connected by a transverse bar K, hereinafter referred to as the "guide bar", and one of them is also connected by means of a rod or link L, with the aforesaid weight beam E. The poise F is of such weight as to balance the platform and other parts connected with the levers C, C', about the pivot or fulcrum of the beam E, when the parts are in the positions shown in Fig. 1.

Upon the cap piece D I mount a computing, or price, beam designated as a whole by M. This beam consists of two parallel bars $m$, $m'$, connected at their ends by bars $m^2$, $m^3$ from the latter of which a curved arm $m^4$ projects through a bridle N, secured to the frame E', and has connected to its free end a poise N'. As shown the computing beam is mounted in a support or standard O and is parallel to the above described guide bar K. A sliding poise R, adapted to be moved longitudinally of the lower member $m$ of the computing beam is connected with the trolley, and the weight thereof and of such connections is balanced in connection with the platform B, levers C, C', and connected parts, by the poise F.

As shown a sliding block or sleeve P is fitted on the guide bar and is connected by loop Q with pivot lugs $r$ projecting from the sliding poise R. The poise R is adapted to be secured in any desired position on the computing beam by means of fingers $r'$ pivoted thereto and adapted to engage with the lower edge of the beam. These fingers extend across the horizontal planes of the guide bar sleeve and somewhat near to the ends thereof, and consequently when the operator presses against the fingers to release the head block the lower ends of the fingers engage with the sleeve and act to center it with respect to the head block and to keep it in central position when the block is being moved along the price beam and leave it in such central position when the block is set at any desired point. The manner of graduating and using the price or computing beam will be readily understood and will therefore not be described here.

In Figs. 5 and 6 I have illustrated slightly modified constructions for connecting the weight supporting levers and the guide bar.

In the construction shown in Fig. 5 the guide bar and the rods or links H are formed integral, and in the lower portions of the links H are formed apertures to receive the pivot lugs $c^8$ at the forward end of the main lever C. The lower ends of the links H are braced and held properly apart by a spacing rod H' having its ends inserted into the apertures formed in such links from the opposite side from the pivot lugs $c^8$. The rod or link L is connected with the adjacent link H by means of a hook $l$ at its lower end passing through an eye $h$, instead of having its lower end threaded and screwed into a block as shown in Figs. 1 to 4.

The construction shown in Fig. 6 differs from that illustrated in Fig. 5 only in the omission of the spacing rod H'.

One of the objects of the present invention is to provide a computing scale which shall retain many of the desirable features which I have employed in manufacturing them, but in which the draft shall be exerted directly, practically, from the weight carrying lever upon the computing beam, that is to say without requiring the intervention of one or more levers each with a fixed fulcrum between the platform lever and the beam. And this is accomplished by the mechanism herein shown and described. The guide K is connected directly with the rising and falling end of the platform lever or weight carrying lever and rises and falls with it in horizontal parallelism, that is to say, so that the guide will in each of its positions be substantially parallel to the horizon. This guide is allowed to move axially with relation to the platform lever because of the knife edge or pivotal connection between them; and it is held in proper position by means of the link or rod extending down from the weighing beam. This weighing beam is thus available not only for indicating the weight of the article on the platform, but also for counterbalancing the draft transmitter (or laterally adjustable connecting device,) the guide bar, its supports, the platform lever, and the platform itself. Where I herein refer to a "weight beam", I mean one capable of the use for which that at F is capable in that it can indicate weights in pounds and ounces simultaneously with or independently of the operation of the parts which indicate unit price and total value. By employing the legs or supports H, the guide bar K can be placed in proximity to the computing beam and the draft transmitter can be short so that it can be readily moved laterally without cramping or binding. But the distance of the platform lever C from the guide bar can be varied under different circumstances and the lengths of the parts H be correspondingly varied without altering the material features of the construction.

By having the computing beam mounted substantially at its center longitudinally I am enabled to place the guide bar K and the connecting device directly back of the platform, that is to say so that they shall lie in the longitudinal vertical planes of the platform, and thereby make the mechanism, as a whole, more compact, and insure its being held level in all of its parts.

I do not herein specifically claim a scale of the character described having in combination with the computing beam, the platform levers, and the intermediate guide devices between the platform levers and the computing beam, of a supplemental weight beam when it is situated within the base and is adapted to counterbalance more or less of the other parts, as I have made a construction of that character the subject matter of another application filed by me June 20, 1896. But with the present construction, as is above described not only can the supplemental beam be used for counterbalancing numerous other parts, but also, by means of its graduations and its poise, indicate weight in pounds and ounces.

I am aware of the fact that it has been proposed to make a computing scale with parts more or less similar to those herein shown, such proposal appearing for instance in Patent No. 790,794, to Ira C. Koehne, dated May 23, 1905, but in which there was radical difference with respect to important parts. In the proposed scale referred to the frame forming one of the connecting parts between the platform levers and the price beam had a horizontal guide track and a vertical leg at one end secured rigidly thereto and a vertical leg at the other end secured to the guide track by a horizontal pivot, said leg also serving as the connecting link of a steelyard structure comprising a weigh beam or tare beam at the top of the scale which is connected to the platform lever by this leg pivotally united to the guide track; the track being thus loosely pivoted to the steelyard rod in such manner as to permit a limited vertical swinging movement of the track bar. Such pivotal connection of the track bar with the legs or either of them is the source of inaccuracy in the scale as it permits the pivoted end of the track or guide bar to rise or fall and thus be thrown out of horizontal parallelism with the price beam.

In my case the frame, which is pivoted to and extends upward from the platform levers and comprises the guide bar and the two leg parts extending downward therefrom, is rigid throughout, that is to say the track bar or guide bar is rigidly secured at both ends to its legs, and is held at all times in horizontal parallelism, and parallel to the axis of the knife edges of the platform lever, and the connection between the said frame and the tare beam is made by means of a link flexibly or pivotally connected at one end to the track bar of the frame and at its other end to the rear end of the tare beam.

I do not herein claim the broad idea of a frame pivoted to the platform lever and extending upward therefrom and comprising a guide bar and two legs extending downward therefrom and rigidly secured to the said guide bar at either end thereof, whereby the said guide bar is held at all times in horizontal parallelism, a price beam, suitable connections between the price beam and the said guide bar, and a bar or link connecting the said frame to a tare beam, electing to present claims for this broad idea in my application Serial No. 205,825, filed April 30, 1904, and the renewal of the application Serial No. 569,493, filed by me November 20, 1895, of which this application is a division.

What I claim is:—

1. In a computing scale, the combination with a tare beam, a price beam and a platform lever, of a connecting frame pivotally connected with said lever at two points, said frame having a horizontal part and two vertical legs each rigidly connected to the horizontal part, suitable connections between the frame and the price beam, and a link connection between said tare beam and said frame having a flexible connection with the frame.

2. In a price scale, a price beam having a value poise thereon, a supporting mechanism for the article to be weighed embodying knife-edged pivots, and a tare beam, of a frame mounted to have free vertical movement adjacent to said price beam, said frame comprising a horizontal guide bar and vertical rods rigidly secured to either end of said guide bar connected with said knife edged pivots on said supporting mechanism, a suitable connection between said guide bar and said price beam, and a flexible connection between said guide bar and said tare beam.

3. In a price indicating scale, a price beam, a platform lever having a widened end, a connecting frame directly hinged to the widened end of the lever at its two extremities, said frame having a horizontal part and two vertical legs, each rigidly connected to the horizontal part, a tare beam, suitable connections between the frame and the price beam, and flexible connections between the frame and the tare beam.

4. In a price scale, the combination with the weight receiver or platform, a mechanism embodying a lever supporting said platform, a weighing beam, a price beam and poises on said beams respectively, of a horizontally arranged guide bar, downwardly extending bars rigidly secured at their upper ends to the guide bar and pivotally connected at their lower ends to said platform supporting lever, a laterally movable connection between said bar and said price beam, and a link loosely connecting said bar to said weighing beam.

5. In a price scale, the combination with the weight receiver or platform, a mechanism embodying a lever supporting said platform, a weighing beam, and a price beam, of a horizontal guide bar mounted adjacent said price beam, downwardly extending rods rigidly secured at their upper ends to said bar and pivotally connected at their lower ends with said lever, a laterally movable connection between said guide rod and said price beam, a rod or link flexibly connected at one end to said guide bar, and at its other end to said weighing beam, and means for counterbalancing, independent of said price beam, the weight of said guide bar and said laterally movable connection.

6. In a price indicating scale, a weighing beam, a price beam, a platform lever, a frame pivoted to the platform lever, said frame having its parts rigidly secured together whereby it has pivotal movement in one direction only in planes transverse to the plane of the price beam, suitable connections between the frame and the price beam, and a link connecting said frame with said weighing beam, said link having flexible connection with said frame.

7. In a price indicating scale, the combination of a price beam having a value-poise thereon, a weight beam having a weight-poise thereon, a supporting mechanism for the articles to be weighed, embodying knife-edged pivots, a freely mounted vertically movable bar adjacent to said price beam, vertically arranged rods rigidly secured at their upper ends to the opposite ends of said bar, and connected at their lower ends with said knife edged pivots on the supporting mechanism for the article to be weighed, a variable connection between said bar and said price beam, and a flexible connection between said bar and said weight beam comprising a link flexibly connected with the bar and also flexibly connected with the said weight beam.

In testimony whereof I affix my signature, in presence of two witnesses.

JOHN W. CULMER.

Witnesses:
 ERNEST SCHWARTZ,
 HENRY H. LUSTIG.